United States Patent
Hamura et al.

(10) Patent No.: US 8,904,012 B2
(45) Date of Patent: Dec. 2, 2014

(54) CLIENT-SERVER INPUT METHOD EDITOR ARCHITECTURE

(75) Inventors: Daigo Hamura, Tokyo (JP); Hiroyuki Komatsu, Kanagawa (JP); Jun Mukai, Tokyo (JP); Taku Kudo, Tokyo (JP); Takuya Oikawa, Tokyo (JP); Toshiyuki Hanaoka, Tokyo (JP); Yasuhiro Matsuda, Tokyo (JP); Yohei Yukawa, Tokyo (JP); Yusuke Tabata, Tokyo (JP)

(73) Assignee: Google Inc., Mountain View, CA (US)

( * ) Notice: Subject to any disclaimer, the term of this patent is extended or adjusted under 35 U.S.C. 154(b) by 183 days.

(21) Appl. No.: 12/953,896

(22) Filed: Nov. 24, 2010

(65) Prior Publication Data

US 2011/0131642 A1   Jun. 2, 2011

Related U.S. Application Data

(60) Provisional application No. 61/264,714, filed on Nov. 27, 2009.

(51) Int. Cl.
| | |
|---|---|
| *H04L 9/32* | (2006.01) |
| *G06F 21/00* | (2013.01) |
| *G06F 15/16* | (2006.01) |
| *H04W 4/20* | (2009.01) |
| *G06F 9/54* | (2006.01) |

(52) U.S. Cl.
CPC .. *G06F 9/54* (2013.01); *H04W 4/20* (2013.01)
USPC ............................... 709/227; 709/229; 726/20

(58) Field of Classification Search
CPC ............ H04W 4/20; G06F 9/54; G06F 21/53; H04L 67/14; H04L 63/08; H04L 63/10
USPC ............ 726/20, 27–30, 2; 709/223–226, 203, 709/229, 227
See application file for complete search history.

(56) References Cited

U.S. PATENT DOCUMENTS

| | | | |
|---|---|---|---|
| 8,245,270 B2 * | 8/2012 | Cooperstein et al. | 726/1 |
| 8,533,291 B1 * | 9/2013 | Murray et al. | 709/218 |

(Continued)

FOREIGN PATENT DOCUMENTS

| | | |
|---|---|---|
| JP | 3-95627 | 4/1991 |
| JP | H-05-307541 A | 11/1993 |

(Continued)

OTHER PUBLICATIONS

Authorized Officer Park Ji Eun, International Search Report and the Written Opinion of the International Searching Authority for Application No. PCT/US2010/058604 dated Aug. 23, 2011, 11 pages.

(Continued)

*Primary Examiner* — Liangche A Wang
*Assistant Examiner* — Abdulkader M Alriyashi
(74) *Attorney, Agent, or Firm* — McDermott Will & Emery LLP

(57) ABSTRACT

In general, one innovative aspect of the subject matter described in this specification can be embodied in methods that include the actions of receiving an input method editor (IME) server request, the IME server request including one or more tokens and requesting that an IME server be instantiated, the IME server executing one or more IME functions based on a key event sent from an IME client, wherein the IME server is a stateful server that stores both requests and responses of a communication session between the IME server and the IME client, determining that the IME server can be instantiated in a restrictive environment based on the one or more tokens, and instantiating the IME server in the restrictive environment. Other embodiments of this aspect include corresponding systems, apparatus, and computer programs, configured to perform the actions of the methods, encoded on computer storage devices.

22 Claims, 11 Drawing Sheets

(56) References Cited

U.S. PATENT DOCUMENTS

| | | | |
|---|---|---|---|
| 2001/0025311 A1* | 9/2001 | Arai et al. | 709/225 |
| 2004/0230908 A1 | 11/2004 | Atkin et al. | |
| 2004/0268256 A1 | 12/2004 | Furuta et al. | |
| 2005/0149726 A1* | 7/2005 | Joshi et al. | 713/164 |
| 2006/0271637 A1* | 11/2006 | McKeon et al. | 709/217 |
| 2006/0277218 A1* | 12/2006 | Franco et al. | 707/200 |
| 2008/0195715 A1* | 8/2008 | Tsai et al. | 709/206 |
| 2009/0106661 A1 | 4/2009 | Sung et al. | |
| 2009/0111378 A1* | 4/2009 | Sheynman et al. | 455/41.1 |
| 2010/0064226 A1* | 3/2010 | Stefaniak et al. | 715/736 |
| 2010/0107246 A1* | 4/2010 | Ohta et al. | 726/22 |
| 2010/0154043 A1* | 6/2010 | Castellucci et al. | 726/7 |
| 2010/0309137 A1* | 12/2010 | Lee | 345/171 |
| 2012/0096365 A1* | 4/2012 | Wilkinson et al. | 715/740 |

FOREIGN PATENT DOCUMENTS

| | | |
|---|---|---|
| JP | H-07-121468 A | 5/1995 |
| JP | 2000-099499 A | 4/2000 |
| JP | 2003-044471 A | 4/2000 |
| JP | 2004-252944 A | 9/2004 |
| JP | 2009015561 A | 1/2009 |
| KR | 1020090016041 A | 2/2009 |
| WO | WO 2008096891 A1 * | 8/2008 |
| WO | WO 2008/124734 A2 * | 10/2008 |

OTHER PUBLICATIONS

Fukuda, Choisest Free Software: Actual Linux Standard Kana Kanji Conversion Software Canna, Nikkei Linux vol. 6, No. 5, May 8, 2004, pp. 86-89.

Lockhart, "Hack #10 Restricting Executing Environment with a Sandbox," Network Security Hacks, O'Reilly Japan, Jun. 11, 2007, p. 20.

Yoshida, "The 'Fundamentals' of Linux System Security Part 1 Greatest Factors which Lower Security Level," Interop Magazine, vol. 11, No. 3, Mar. 1, 2001, pp. 130-133.

Shinagawa, et al., "Simplifying Security Policy Descriptions Exploiting Phases in Execution, Symposium on Advanced Computing Systems and Infrastructures," SACSIS2006 Collected Papers, Information Processing Society of Japan, vol. 2006, No. 5, May 22, 2006, pp. 495-503.

Canna—NEC Canna Project, Nikkei Linux, 2004, pp. 86-89.

Social IME, 2008 <www.webarchive.org/web/20081210111313/http://www.social0ime.com/api.html>.

* cited by examiner

CLIENT-SERVER INPUT METHOD EDITOR ARCHITECTURE

CROSS-REFERENCE TO RELATED APPLICATIONS

This application claims priority to U.S. App. No. 61/264,714 filed on Nov. 27, 2009, the disclosure of which is expressly incorporated herein by reference in its entirety.

BACKGROUND

This disclosure relates to input method editors.

Languages that use a logographic script in which one or two characters correspond roughly to one word or meaning have more characters than keys on a standard input device, such as a computer keyboard or a mobile device keypad. For example, the Japanese language contains hundreds of characters in both katakana and hiragana. The mapping of these potentially many to one associations can be implemented by input method editors that facilitate entry of characters and symbols not found on input devices. Accordingly, a Western style keyboard can be used to input Japanese characters. Likewise, input methods can be used for using a Western style keyboard or some other input device to input many other languages that include ideograms, such as the Chinese language, the Korean language, and other languages.

To implement an input method, a user typically must install a client side software application program and a library. However, such installations can be inconvenient when a user is working on computer devices that do not belong to the user, e.g., a public computer device, or a second computer in a work environment, etc. Further, the client side software application program can be memory and processor intensive, and thus cumbersome for the client, and can be language dependent, requiring an application program for each desired language.

SUMMARY

This specification describes technologies relating to input method editors, and input method editors having a client-server architecture, in particular.

In general, one innovative aspect of the subject matter described in this specification can be embodied in methods that include the actions of receiving an input method editor (IME) server request, the IME server request including one or more tokens and requesting that an IME server be instantiated, the IME server executing one or more IME functions based on a key event sent from an IME client, wherein the IME server is a stateful server that stores both requests and responses of a communication session between the IME server and the IME client, determining that the IME server can be instantiated in a restrictive environment based on the one or more tokens, and instantiating the IME server in the restrictive environment. Other embodiments of this aspect include corresponding systems, apparatus, and computer programs, configured to perform the actions of the methods, encoded on computer storage devices.

In general, another aspect of the subject matter described in this specification can be embodied in methods that include the actions of receiving an input method editor (IME) server request, the IME server request including one or more tokens and requesting that an IME server be instantiated, the IME server executing one or more IME functions based on a key event sent from an IME client, wherein the IME server is a stateful server that stores both requests and responses of a communication session between the IME server and the IME client, processing the one or more tokens, determining that the IME server can be instantiated based on the processing, instantiating the IME server in a restrictive environment, the restrictive environment limiting the functionality of the IME server, determining that the IME server is not executing in the restrictive environment, and halting the IME server in response to the determining. Other embodiments of this aspect include corresponding systems, apparatus, and computer programs, configured to perform the actions of the methods, encoded on computer storage devices.

In general, another aspect of the subject matter described in this specification can be embodied in methods that include the actions of establishing a first session between a first input method editor (IME) client and a first IME server, requesting a second session between a second IME client and the first server, determining that a version of the first IME server is different than a version of the second IME client, halting the first server in response to determining that the version of the first IME server is different than the version of the second IME client, and instantiating a second IME server, the second IME server having a version that is the same as the version of the second client. Other embodiments of this aspect include corresponding systems, apparatus, and computer programs, configured to perform the actions of the methods, encoded on computer storage devices.

In general, another aspect of the subject matter described in this specification can be embodied in methods that include the actions of establishing a first session between a first input method editor (IME) client and a first IME server, requesting a second session between a second IME client and the first IME server, determining that a version of the first IME server is the same as a version of the second IME client, establishing a second session between the second IME client and the first IME server in response to the determining, and executing the first session and the second session. Other embodiments of this aspect include corresponding systems, apparatus, and computer programs, configured to perform the actions of the methods, encoded on computer storage devices.

In general, another aspect of the subject matter described in this specification can be embodied in methods that include the actions of receiving an input method editor (IME) server request, the IME server request being transmitted by a first IME client, instantiating a first IME server based on the IME server request, establishing a first session between the first IME client and the first IME server, requesting a second session between a second IME client and the first IME server, determining that a version of the first IME server is different than a version of the second IME client, halting the first IME server in response to determining that a version of the first IME server is different than a version of the second IME client, instantiating a second IME server, the second IME server having a version that is the same as the version of the second IME client, and establishing a second session between the second IME client and the second IME server. Other embodiments of this aspect include corresponding systems, apparatus, and computer programs, configured to perform the actions of the methods, encoded on computer storage devices.

In general, another aspect of the subject matter described in this specification can be embodied in methods that include the actions of receiving a key event at an input method editor (IME) server transmitted to the IME server from an IME client that is in communication with the IME server, wherein the IME server is a stateful server that stores both requests and responses of a communication session between the IME server and the IME client, and the IME client is a stateless IME client that issues a request to the IME server based on the key event, identifying, by the IME server, one or more logographic characters based on a key event, generating, by the IME server, rendering information corresponding to the one or more logographic characters, and transmitting the rendering information from the IME server to the IME client to display the one or more logographic characters. Other embodiments of this aspect include corresponding systems, apparatus, and computer programs, configured to perform the actions of the methods, encoded on computer storage devices.

In general, another aspect of the subject matter described in this specification can be embodied in methods that include the actions of receiving a request from an input method editor (IME) client that is stateless, instantiating an IME server based on the request, the IME server being stateful, generating a communication path between the IME client and the IME server, the communication path having a corresponding path name, providing the path name to the IME client, receiving a key event at the IME server, the key event being transmitted to the IME server through the communication path from the IME client, identifying one or more logographic characters based on the key event, generating rendering information corresponding to the one or more logographic characters, and transmitting the rendering information from the IME server to the IME client to display the one or more logographic characters. Other embodiments of this aspect include corresponding systems, apparatus, and computer programs, configured to perform the actions of the methods, encoded on computer storage devices.

In general, another aspect of the subject matter described in this specification can be embodied in methods that include the actions of generating a key event at an input method editor (IME) client, the IME client being a stateless IME client that stores only requests that it issues to the IME server and that issues a request to an IME server for each key event, recording by the IME client the key event in a key event sequence, the key event sequence storing the key event and at least one or more previous key events that were previously transmitted to the IME server, transmitting the key event to an IME server that is in communication with the IME client, the IME server being a stateful server that stores both requests and responses of a communication session between the IME server and the IME client, determining, at the IME client, that the IME server has stopped functioning, establishing a session with a second IME server in response to the determination that the IME server has stopped functioning, the second IME server being a stateful server, and transmitting the recorded key event sequence to the second server after establishing the session. Other embodiments of this aspect include corresponding systems, apparatus, and computer programs, configured to perform the actions of the methods, encoded on computer storage devices.

In general, another aspect of the subject matter described in this specification can be embodied in methods that include the actions of instantiating an input method editor (IME) client on a device, the IME client being a stateless IME client, receiving user input to the device, generating a key event based on the user input, the key event being generated by the IME client, recording the key event in a key event sequence that is stored in a computer-readable storage medium of the device, transmitting the key event to an IME server that is in communication with the IME client and that is a stateful IME server, determining that the IME server has stopped functioning, instantiating a second IME server in response to the determining, the second IME server being a stateful IME server, establishing a session between the IME client and the second IME server, and transmitting the key event sequence to the second IME server after establishing the session. Other embodiments of this aspect include corresponding systems, apparatus, and computer programs, configured to perform the actions of the methods, encoded on computer storage devices.

The details of one or more embodiments of the subject matter described in this specification are set forth in the accompanying drawings and the description below. Other features, aspects, and advantages of the subject matter will become apparent from the description, the drawings, and the claims. Further, aspects of the subject matter described in this specification, including the aspects described above, can be combined in one or more combinations.

DESCRIPTION OF DRAWINGS

Like reference symbols in the various drawings indicate like elements.

DETAILED DESCRIPTION

§1.0 Overview

Figure 1:
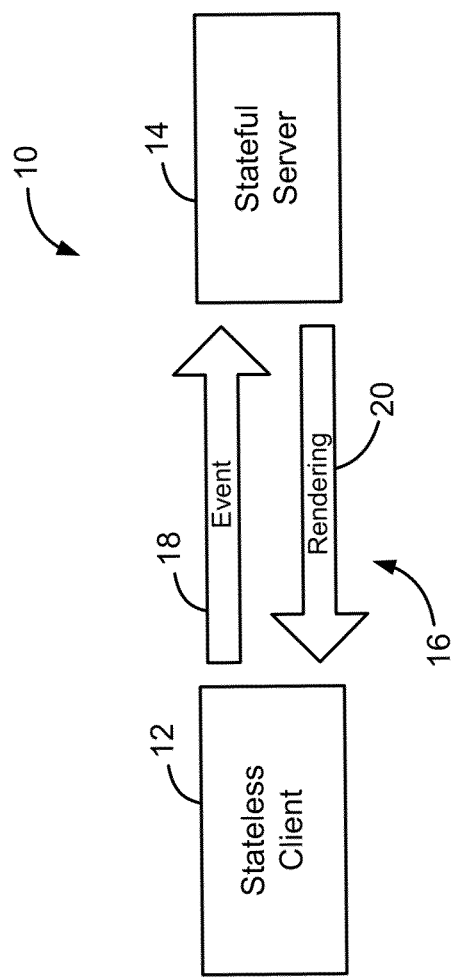
FIG. 1 is a block diagram illustrating a general client-server architecture for an input method editor (IME).

This specification describes technologies related to an input method editor (IME) that includes a client-server architecture. Although example embodiments will be described in the exemplar context of the Japanese language, the present disclosure is readily applicable to other languages that use logographic scripts, including Chinese, Korean and/or Indic languages.

Embodiments of the client-server architecture include a stateless client that interfaces with a stateful server. As used herein, the term "client" refers to an application program or system that accesses a service provided by a service provider. The term "server" refers to a service provider that provides a service to a client. The terms client and server do not necessarily refer to separate computer devices, as the client and server, as those terms are used herein, can be implemented on a single computer device. The server is stateful in the sense that the server can store both requests and responses of the communication session between the server and the client. In this manner, the server is aware of the full history of communications between the client and server for a particular session. The client is stateless in the sense that it can store requests issued to the server, but does not store the server responses. Consequently, the client does not store the full history of communications between the client and server for a particular session.

In accordance with aspects of the client-server IME architecture provided herein, a session is established between a client and a server. A session is a semi-permanent information interchange between the IME client and the IME server. The information interchange is semi-permanent in that it is achieved through one or more connections that can be opened or closed during the lifetime of a session. In short, the lifetime of a session is longer than the lifetimes of connections that occur during the session. The server can coordinate concurrent sessions with a plurality of clients. The server, however, can only communicate with one client at a time. Consequently, a connection between the client and server is opened to enable the exchange of information, and is subsequently closed to enable another client to communicate with the server.

The client receives user input, the server executes functionality based on the user input and generates rendering information based thereon, and the client renders, or displays characters based on the rendering information. Using the stateless client and the stateful server, the client-server architecture provides a portable and language-independent solution that can be implemented across any of various operating systems, or platforms.

Embodiments of the client-server architecture include the server executing in a restrictive environment, or sandbox, which limits the functionality of the server. In this manner, a malicious client or user that somehow establishes a session with the server is not able to access sensitive information through the server.

Embodiments of the client-server architecture enable the client and/or server as well as the communications protocol between the client and server to be updated (e.g., from a current version to a new version) without requiring the system on which they are executing to be rebooted. A connection between the IME client and the IME server is maintained when different versions of the IME client and IME server have compatible protocols. Only when the IME client is an older version than the IME server and the protocols are incompatible is the connection stopped.

Embodiments of the client-server architecture also enable a session to be recovered in the event that the stateful server crashes, aborts, freezes, or otherwise ceases to function properly, and a new server is instantiated. For example, the IME client sends each input key event as they occur to the IME server, and maintains the each input key event of a session. When the IME server is rebooted (e.g., due to a crash, update, etc.) the IME client will send the entire input sequence of key events to the IME server.

The features described above can be combined in various combinations. For example, the sandboxed features can be combined with the feature that enables the client and/or server as well as the communications protocol between the client and server to be updated without rebooting. Likewise, these features can be combined singularly or in combination with the feature that enables a session to be recovered in the event that the stateful server crashes, aborts, freezes, or otherwise ceases to function properly.

The client provides a user interface and a renderer, while the server executes the core IME functionality. This core IME functionality includes management of text composition and text conversion from a first syllabary (e.g., Hiragana) to a second syllabary (e.g., Kanji).

The client is implemented using the IME framework provided by the particular operating system of the device on which the client is executed. The functions of the client include receiving user input (e.g., "a" is input by the user), generating a key event based on the user input, transmitting the key event to the server, receiving rendering information provided by the server, and providing the rendering information for display to the user. As discussed in further detail below, a corresponding character based on the key event can be displayed (e.g., "□" in response to the "a" key event), and/or a list of candidate characters can be presented, from which the user can choose an appropriate candidate. The client can use any implementation for the displaying the list. In the exemplar case of a web browser, Ajax and javascript can be used.

The client can be provided as an application program that is executed on a device, and one or more clients can communicate with a particular server. Such application programs receive text inputs from an input device (e.g., mouse, keyboard, touchpad) and can include, but are not limited to, web browsers, presentation programs, word processors and/or spreadsheet programs. Unlike the server, the client does not manage any states. Because the role of client is stateless, the dependencies to the IME framework of the particular operating system are much smaller than those of traditional IMEs.

In some embodiments, communication between the client and server can be established using inter-process communication (IPC). IPC provides a set of techniques for the exchange of data among multiple threads in one or more processes (e.g., client process and server process). In some embodiments, these processes can be running on one device. In other embodiments, these process can be running on multiple devices connected by a network. IPC method techniques can include remote procedure call (RPC). RPC enables a subroutine or procedure (e.g., the server) to execute in another address space that is different from the address space of the calling program application (e.g., the client).

In some embodiments, the server does not need to be instantiated using an IME framework of the corresponding operating system. This makes the server process platform independent and portable. For example, different IMEs running on different platforms can connect to the same server. The server handles all key events received from the client, generates rendering information, and transmits the rendering information to the client. The rendering information includes the current and/or partially converted text to be displayed on the client application, as well as the contents for any candidate window.

§2.0 Client-Server Architecture

FIG. 1 is a block diagram illustrating a general client-server architecture 10 for an input method editor (IME). The client-server architecture 10 including a stateless client 12, a stateful server 14 and a communication session 16 therebetween. The communication session 16 includes key events resulting in requests 18 transmitted from the client 12 for reception by the server 14, and rendering information provided in responses 20 transmitted from the server 14 for reception by the client 12. The core IME functions are written to be as portable as possible and are executed by the server 14. As used herein, the term "portable" indicates the ability of the server 14 to be run on various operating systems including, but not limited to, Windows, Mac, Linux and/or Google Chrome. In short, the server 14 is unaware of the operating system functionalities, and provides any required functionalities it may need. The client 12 wraps the server's interface and deals with IME application program interfaces (APIs) for each operating system.

As noted above, one or more clients 12 can communicate with the server 14. In the case where the client(s) 12 and server 14 are executed on a common device, discussed in further detail below, a user typically only interfaces with one client 12 at a time. However, the user can quickly switch between clients even while in the middle of interfacing with one client. For example, a user inputting text into first client (e.g., a client instantiated for a word processor application on a particular device) could switch their attention to a second client (e.g., a client instantiated for a web-browser application on the particular device), while in the middle of typing text into the first client. Consequently, the input state for the client 12 associated with the word processor application needs to be preserved. The server 14 can accept and keep track of key events from different clients 12, by establishing a unique session with each client 12, as discussed in further detail below.

During a session, multiple connections between the client 12 and server 14 can be opened and closed. A session can remain active even when the connection between the client 12 and server 14 has been closed. For example, a connection can be opened to enable a key event to be transmitted to the server 14 from the client 12, or to enable rendering information to be transmitted to the client 12 from the server 14. The individual connections, however, can have a short lifespan within a session timeframe. In other words, the lifespan of a connection is shorter than the lifespan of its associated session. For example, the client 12 opens a connection to the server 14, sends a key event to the server 12, receives a response from the server 12 and then the connection is closed. Consequently, each transmitted key event is accompanied by a session identification (SID). The SID enables the server 14 to keep track of which key events were received from which clients 12. More specifically, an SID corresponding to a session between one client 12 and the server 14 is unique to the SID corresponding to a session between another client 12 and the server 14. One exception is a command transmitted by the client 12 to create a session (e.g., "CreateSession"). When the client 12 calls this command without an SID, the server 14 creates a session, generates a corresponding SID, and transmits the SID to the client 12. Examples of this process are provided below.

As introduced above, the client 12 is implemented using an operating system specific, or platform specific IME framework. Exemplar IME frameworks can include the text service framework (TSF) or IMM32 for Microsoft Windows. The IME framework is an application programming interface (API) that enables advanced, source independent text input. Applications that are unaware of particular IME frameworks (e.g., are IME framework neutral) can be supported by enabling an unaware application support (UAS) including Cicero Unaware Application Support (CUAS).

By way of non-limiting example, embodiments using TSF will be described. In a TSF environment, "ImeTextService" handles session requests, key inputs by users, and responses from the server 14. When the IME is initially activated at the client 12, the client 12 opens an IME user interface (IME-UI) establishes a connection to the server 14 and starts the session in "ImeTextService::Activate." The IME-UI can be provided as a portal, or window within the current application (e.g., an IME-UI window pop-up in a word processing application). "ImeTextService::OnTestKeyDown" is called each time a user inputs a character (e.g., with each key event). The client 12 key event sent to the server 14 includes key code and modifiers, and the client 12 receives rendering information from the server 14 in response.

"ImeTextService::HandleKey" is called when the server 14 moves to process the key input. The rendering information sent from the server 14 is applied to the IME-UI in the client application. More specifically, the client draws preedit text and adds attributes of segments to the text, if appropriate. If the response from the server 14 includes multiple candidates, the client 12 displays the candidates in a candidate list in the IME-UI. "ImeCandidateWindow" is called to render candidate data. The client 12 can offer several functions through a language bar. Such functions can include, but are not limited to, configuration, displaying input state and showing a help document. These functions are implemented in "ImeButtonMenu."

The server 14 can be executed as a component object model (COM) out-of-process server. The COM interface is used to invoke methods of the server 14, and to send and receive data. "ConverterSession" is a class that implements functions called from the client 12. If not yet existing, a COM instance of "ConverterSession" is created by "CoCreateInstance," and the client 12 establishes a connection with the server 14 through the instance. The server 14 implements methods including, but not limited to, "ConverterSession::CreateSession( )," which requests a new session be created, "ConverterSession::DeleteSession( )," which ends a session, and "ConverterSession::SendKey(ULONG key_code, ULONG key_modifiers, VARIANT* response), which sends key events from the client 12 to the server 14 and receives rendering information from the server 14.

Although the above-described embodiments have been provided in the context of a Windows operating system, the client-server IME architecture are readily applicable to other operating systems. For example, the client-server IME architecture can be implemented using IMKit for the Leopard operating system.

§2.1 Example Client-Server Architecture Implementations

Figure 2:
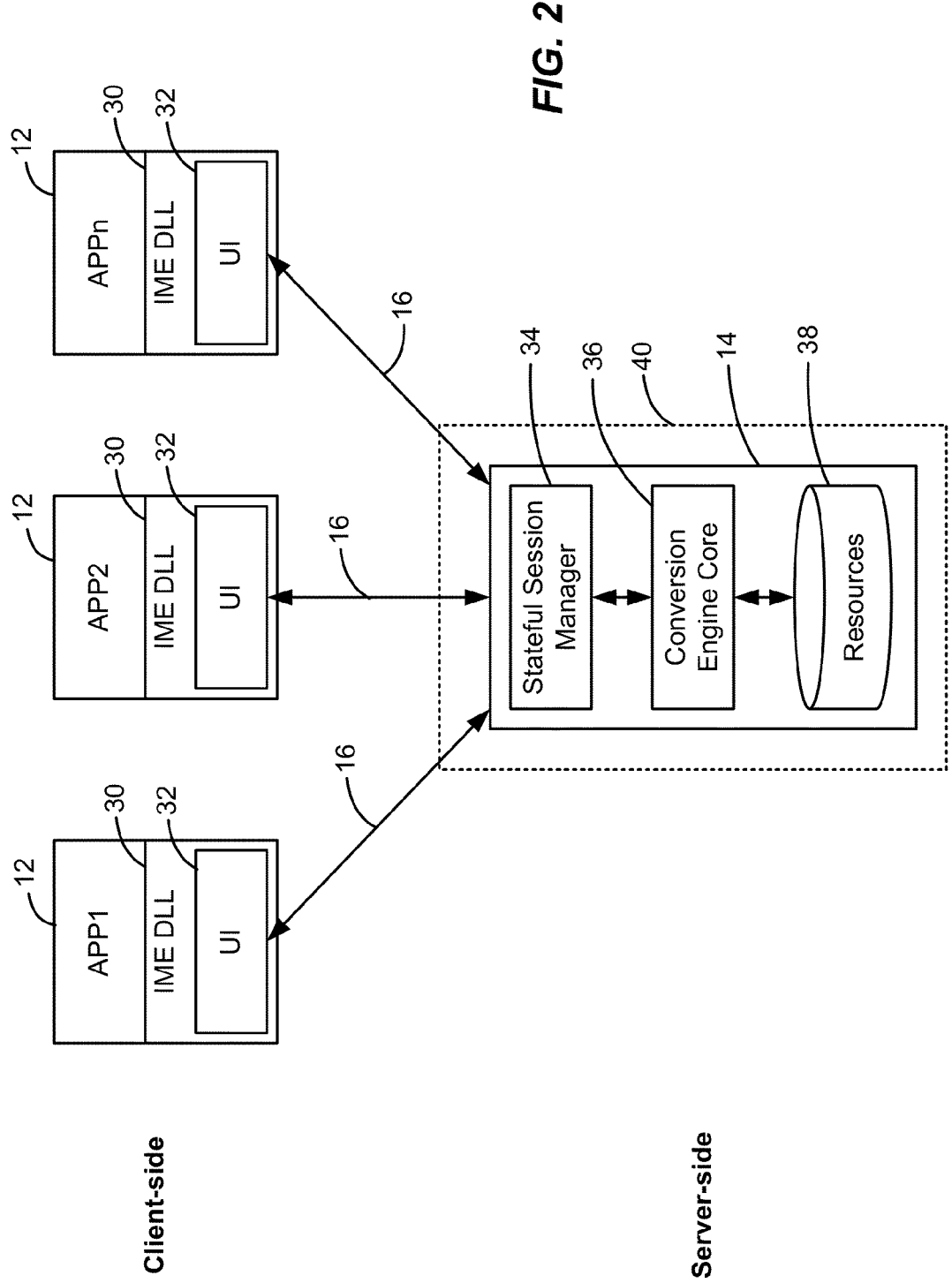
FIG. 2 is a block diagram illustrating an exemplar client-server IME architecture.
Figure 3:
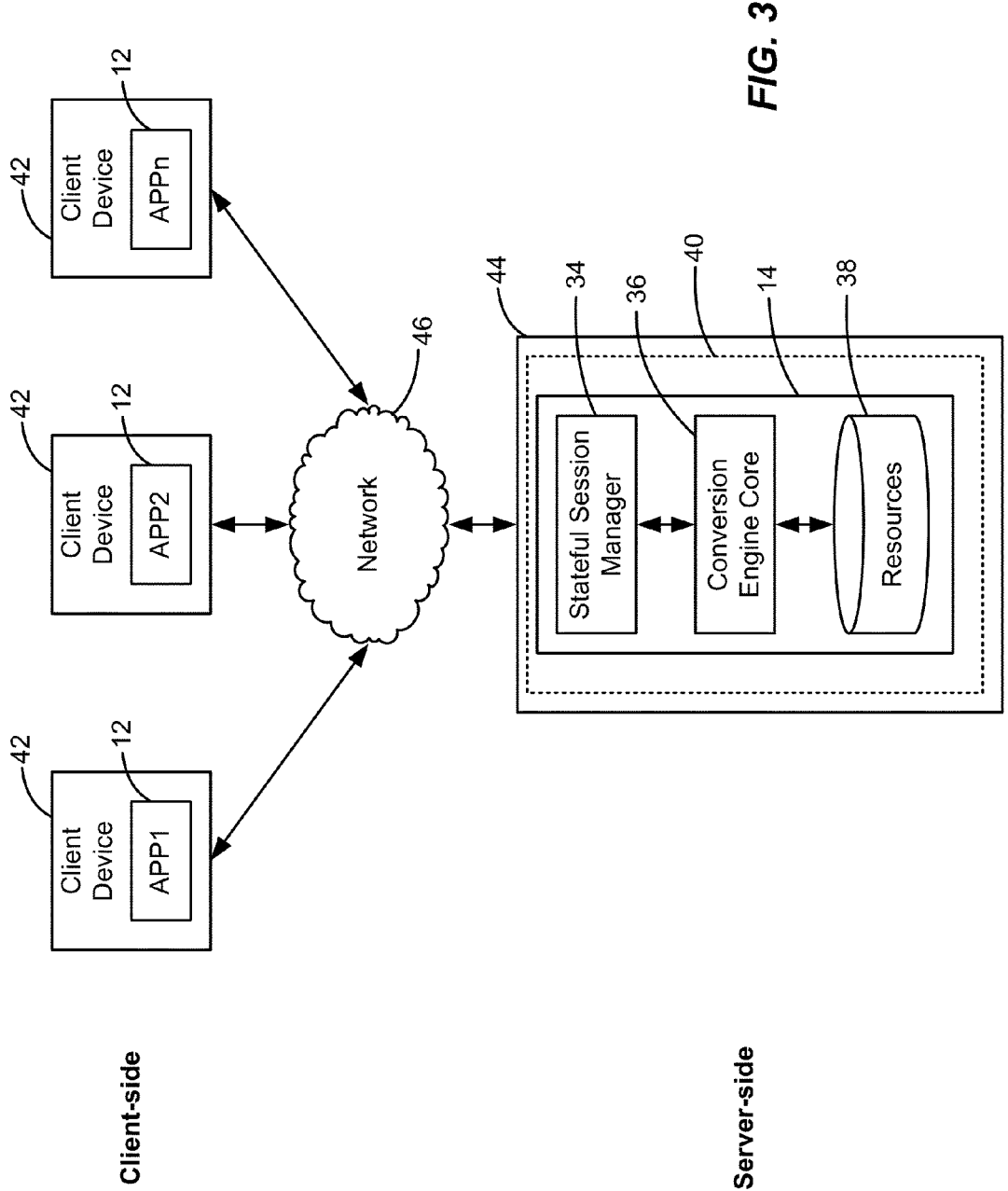
FIG. 3 is a block diagram illustrating another exemplar client-server IME architecture.

Various types of architectures can be used to implement the system of FIG. 1, examples of which are shown in FIGS. 2 and 3. FIG. 2 is a block diagram illustrating an exemplar client-server IME architecture. In the client-server IME architecture of FIG. 2, the clients 12 and the server 14 are executed on the same device. As used herein, the term device refers to a processing or computer device that can include, but is not limited to, a desktop computer, a laptop computer, a tablet computer, a server system, a personal digital assistant (PDA), and/or a mobile telephone. The clients 12 are provided as application programs APP1, APP2, . . . APPn, each of which includes an IME dynamic link library (DLL) 30 and a corresponding IME-UI 32. Each client 12 is instantiated for a corresponding user program, e.g., the three clients 12 shown may have been respectively instantiated for a word processing program, an browser program, and an e-mail program. The server 14 includes a stateful session manager 34, a conversion engine core 36 and resources 38. In some embodiments, the server 14 can be executed within a sandbox 40. The stateful session manager 34 coordinates multiple connections from a plurality of clients 12 (e.g., an email applications and a web browser application).

FIG. 3 is a block diagram illustrating another exemplar client-server IME architecture. The client 12, or multiple clients 12 are executed on one or more client devices 12, and the server 14 is executed on a separate device 44. The client devices 42 communicate with the server through a network 46 that can include, but is not limited to, a local area network (LAN) or a wide area network (WAN) (e.g., the Internet).

The client-server architectures can be implemented using a single-thread and single-connection model, such as IPC. The server 14 opens only one port and handles multiple connections from clients 12. The single-thread and single-connection model provides simplicity and portability. Almost all platforms support single-thread and single-connection IPC.

As described above, the client 12 connects to the server 14 with every key event (e.g., pushing [A] button) and obtains from the server 14 rendering information corresponding to the key event (e.g., [A] should be displayed as Japanese [あ]). The connection is stateless in that it is not kept alive, and is independent of any other connection between the client 12 and server 14. In general, the lifetime of each IPC connection is very short. For example, after the server transmits the rendering information to the client 12, it immediately closes the connection and waits for other connections.

In some instances, the server 14 could be blocked if, for example, a malicious user connects to the server and does nothing. In other instances, the client 12 could be blocked if, for example, a malicious server does not send any response to the client 12. To prevent such situations, a timeout is implemented for each connection. More specifically, if the client 12 or server 14 does not send a message within a predetermined time period (e.g., 500 msec), the current connection is closed.

Once the server has been instantiated, the server generates a connection path name for communication between the client and server. Some embodiments, for example, employ a named pipe path name that is unique with respect to named pipe path names used for other sessions. By using a unique named pipe path name, a malicious user is inhibited from generating a fake named pipe server before a valid server is instantiated. Accordingly, the path name is provided by generating a random, multi-bit path name (e.g., 128-bit randomly generated path name). The server stores the path name in the user profile directory. After the server is instantiated, but before sending the first key event, the client retrieves the path name from the user profile directory and transmits the key event using the retrieved path name.

Another exploit can occur when a malicious application saves a fake path name in the user profile before the server launches (i.e., before the server is able to save the actual path name to the user profile). In such an instance, and if the client used the fake path name to connect, the client could connect to a malicious, or fake, server. For example, a malicious application saves a path name to the user profile, which path name would result in the client sending key event information to a malicious server, and not the intended server.

The client-server architecture 10, however, can implement techniques that enable the client to know that it is connecting to a valid server. One exemplar technique can include the server locking the file that holds path name. Other exemplar techniques can include the operating system providing the peer's process ID (PID) of the path, providing an API that knows the peer's PID, and/or sending the PID via the connection. Further, the path name should only be accessible by valid users. Consequently, a valid security token can be provided to the corresponding API. The security token enables access by the local system, administrators, and current users. Other users are denied access.

The PID is a unique ID that is assigned by the operating system to each process. The server or client can identify its peer's ID by using an API that the operating system provides. Once a process determines its peer's PID, the process knows various information related to the PID including the owner (e.g., username) corresponding to the PID. By checking the owner, the server or client process can know its peer's user ID. If the username is different than what is expected, the server or client process can refuse the connection.

As discussed above, the server 14 can be executed within a sandbox. A sandbox is a restrictive environment in which a program runs, and it typically facilitated by a library that enables processes, such as the server process, to execute within the restrictive environment. When sandboxed, the server process has limited functionality. In some embodiments, the server process can only access CPU cycles and memory. In such embodiments, the sandboxed server process cannot write to disk or display its own window, for example. The allowed functionality of the server process is regulated by an explicit policy. The sandbox library is included in the server process code. In some embodiments, the code is not executed inside a virtual machine and thus the server process operates at native speed and has direct access to the operating system API.

The sandbox leverages the security provided by the particular operating system to allow code execution that cannot make persistent changes to the computer or access information that is confidential. The architecture and exact assurances that the sandbox provides are dependent on the operating system. In Windows, for example, code cannot perform any form of I/O without making a system call. In most system calls, Windows performs a security check. The sandbox ensures that the security checks fail for the particular actions that the server process is prohibited from performing as defined in the corresponding policy.

In some embodiments, the sandbox relies on the protection provided by operating system mechanisms that can include, but are not limited to, tokens, a objects and/or integrity levels. These exemplar mechanisms are highly effective at protecting the operating system, its configuration, and user data. The actual restrictions are configured by the policy, which is a programmatic interface that can be called to define the restrictions and allowances of the server process. In some embodiments, exemplar mechanisms that control the restrictions include a main token, an impersonate token and a job token. Some embodiments further include an integrity level (e.g., embodiments including the Windows Vista™ operating system).

Once the server has been instantiated, a series of checks can be executed to ensure that the server is not being executed as a normal process (i.e., a non-sandboxed process). These checks can include checking the values of one or more tokens that are set by the client. The server can process the one or more tokens and can compare resultant values to expected values. If the resultant values are not equal to the expected values, the server is not sandboxed and the server is halted. Another check can include comparing an identification provided by the operating system to an expected identification. If the provided identification is equivalent to the expected identification, the server is sandboxed and the client-server connection is executed as provided herein.

§2.1.1 Example Server Architecture And Implementation

Figure 4:
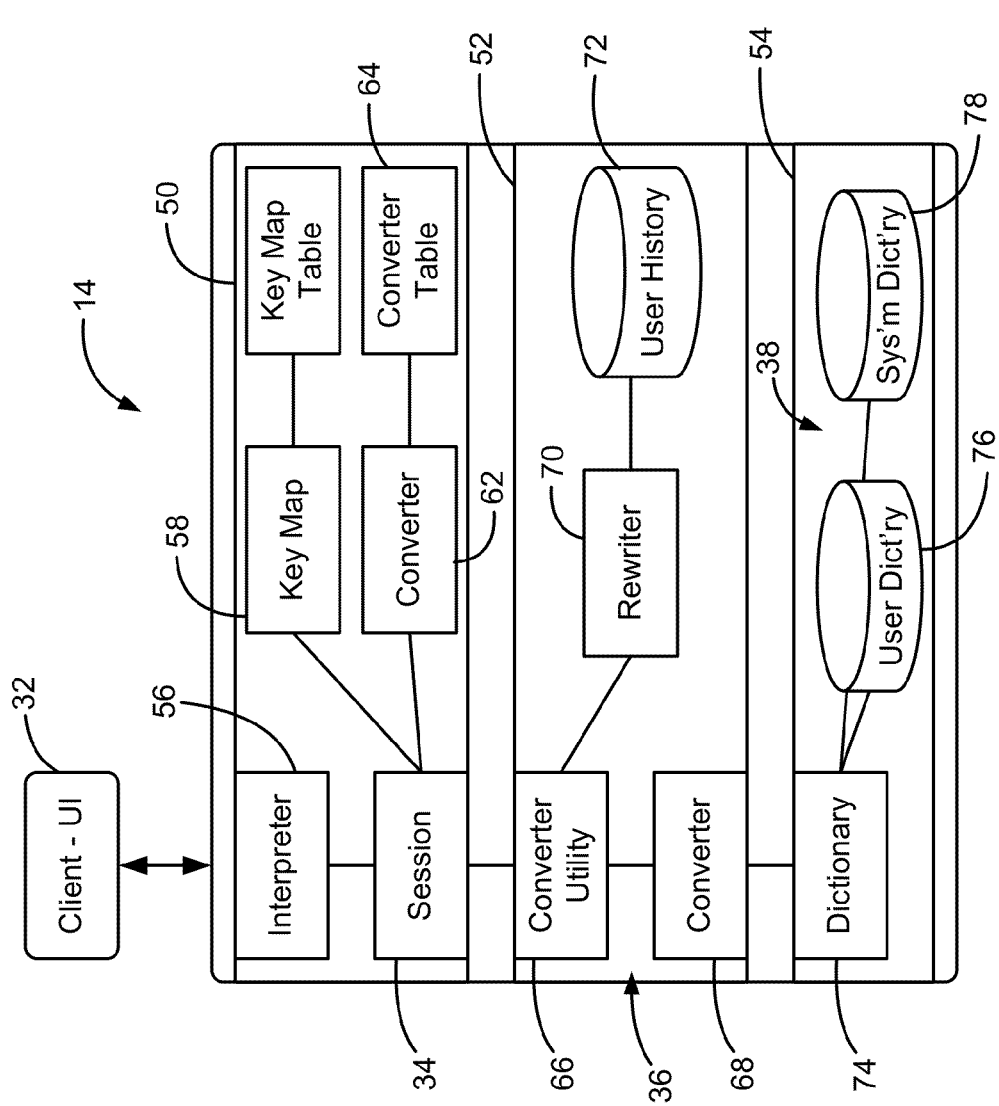
FIG. 4 is a functional block diagram illustrating a server architecture for a server.

FIG. 4 is a functional block diagram illustrating a server architecture for a server 12. The server 12 includes a session layer 50, a converter layer 52 and a storage layer 54. The session layer 50 includes an interpreter module 56, the stateful session manager 34, a key map module 58, a key map table 60, a converter module 62 and a converter table 64. The converter layer 52 provides the conversion engine core 36 and includes a converter utility module 66, a converter module 68, one or more rewriter modules 70 and a user history record 72. The storage layer includes a dictionary module 74 and the resources 38, which can include a user dictionary 76 and a system dictionary 78.

The key map table 60 and the converter table 64 are data tables and the key map module 58 and the converter module 62 are modules that access the data stored in the respective data tables. The key map table 60 provides data for converting from a pair to a command. Each pair includes an input state and an input event (e.g., keyboard event). For example, a pair of "composition" state and [space] key event is bound to a "StartConversion" command, a pair of "conversion" and [space] is bound to "SelectNextCandidate" command, and a pair of "conversion" and [enter] is bound to a "CommitCurrentCandidate" command. The key map 58 module performs such conversions based on the key map table 60. The converter table 64 is a table for conversion, Romaji to Hiragana, for example (e.g., [a] to [あ], [ka] to [か]). An exemplar converter table 64 is discussed below with reference to FIG. 5A. The converter 62 module performs such conversions based on the converter table 64.

The session layer 50 handles all stateful tasks and interprets the received key events. More specifically, the session layer 50 receives all key events from users and interprets them to commands. Using Japanese as an exemplar language, a key event corresponding to the user inputting [a] is translated to [h], and/or also a key event corresponding to the user pressing a space bar [space] is translated into a conversion command. The converter layer 52 is responsible for all conversion and performs the core functionalities of the IME. The converter module 68 is provides the conversion functionality for converting a query string to a lattice of candidate strings. For example, when a query is [あいのうた] (ainouta), a lattice of candidate strings can be provided as [愛の歌, 愛の詩, ...] (see FIG. 6B). The storage layer 54 manages dictionary access. The storage layer 54 is the bottom layer and manages various kinds of dictionary data and is immutable. The system dictionary 78 includes sets of a Hiragana key, a Japanese word value, part-of-speech, etc. Exemplar sets provided by the system dictionary 78 can include {あい (ai), 愛 (ai/love), noun}, {の (no), の (no), particle}, {うた (uta), 歌 (uta/song), noun}. The user dictionary 76 also provides such set, but is mutable and modifiable by the user.

As discussed in further detail below, an exemplar process implemented in the session layer 50 can include the server layer receiving a key event from the client UI, interpreting the event to a command, sending a query to the converter layer 52, if necessary, receiving results of the query from the converter layer 52, generating rendering information based on the results, and sending the rendering information to the client UI. For example, and using Japanese as an exemplar language, the interpreter module 56 can interpret a key event as an insert character (InsertCharacter) command to insert a Japanese Hiragana character (e.g., [あ]) in place of a corresponding Romaji character (e.g., [a]).

Figures 5A, 5B:
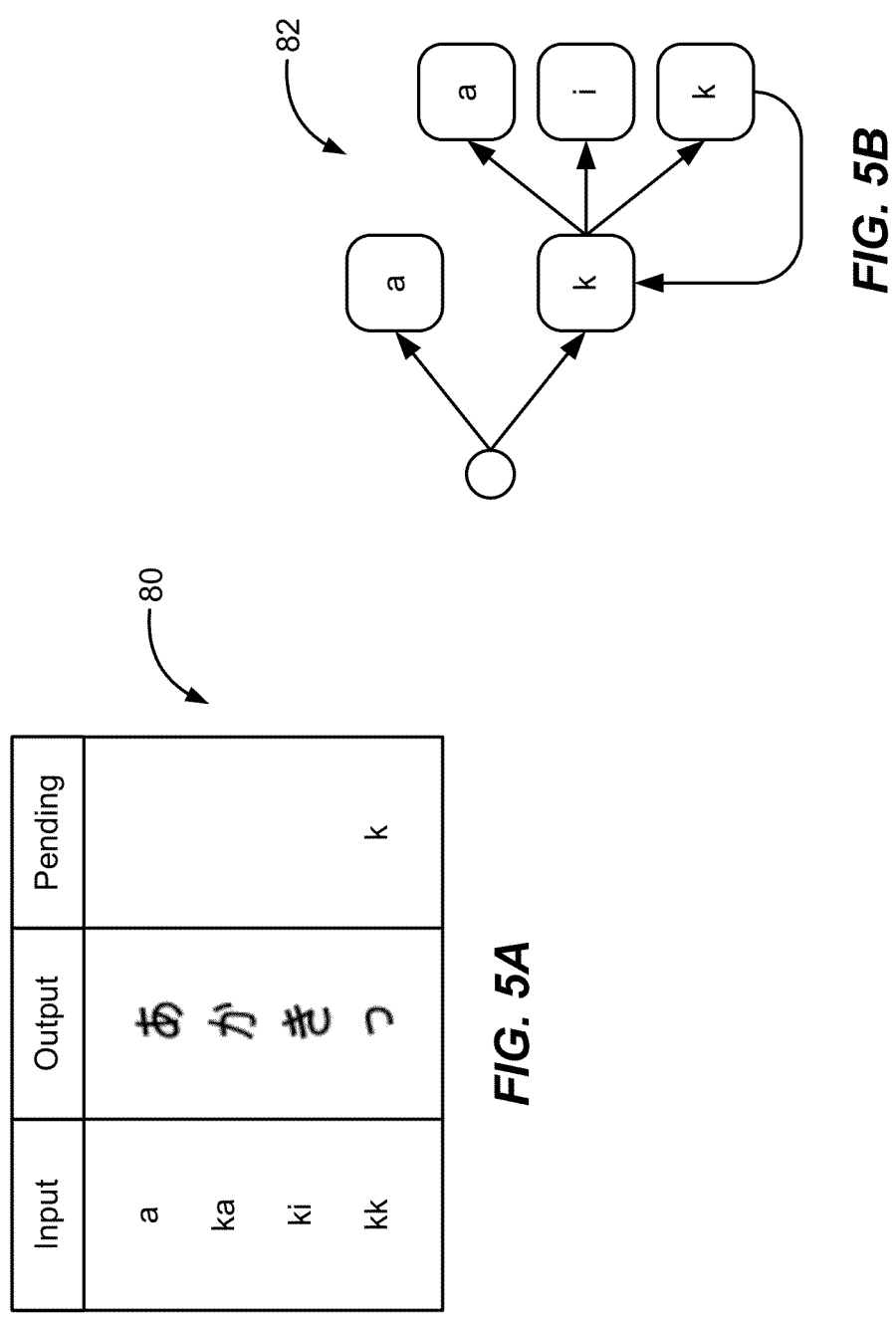
FIG. 5A is a table illustrating exemplar text conversion.
FIG. 5B is an exemplar diagram illustrating an exemplar rule corresponding to the exemplar text conversion of FIG. 5A.

With particular reference to FIGS. 5A and 5B, the session layer 50 can compose a string of Hiragana characters from key events. The string is called a preedit. The preedit is provided to the converter layer 52 as a query that is processed to provide conversion, as discussed in further detail below. This conversion can be described by a deterministic finite automaton (DFA) and a rule. FIG. 5A illustrates an exemplar snippet of a DFA 80 in the form of a Romaji to Hiragana converter table, and FIG. 5B illustrates its corresponding rule 82.

The exemplar converter table of FIG. 5A supports Romaji to Hiragana conversion. For example, if [a] is pressed, [あ] is inserted. The rule [kk] includes a pending field. More specifically, when rendering information is output to a client, the DFA state is reset. However, when the pending is specified, the current DFA state is written with the pending state. For example, if the user inputs [kk], [っ] is first provided to the client, and the IME assumes that [k] is input after that. If the user types [kki], the output becomes [っき].

Figure 6A:
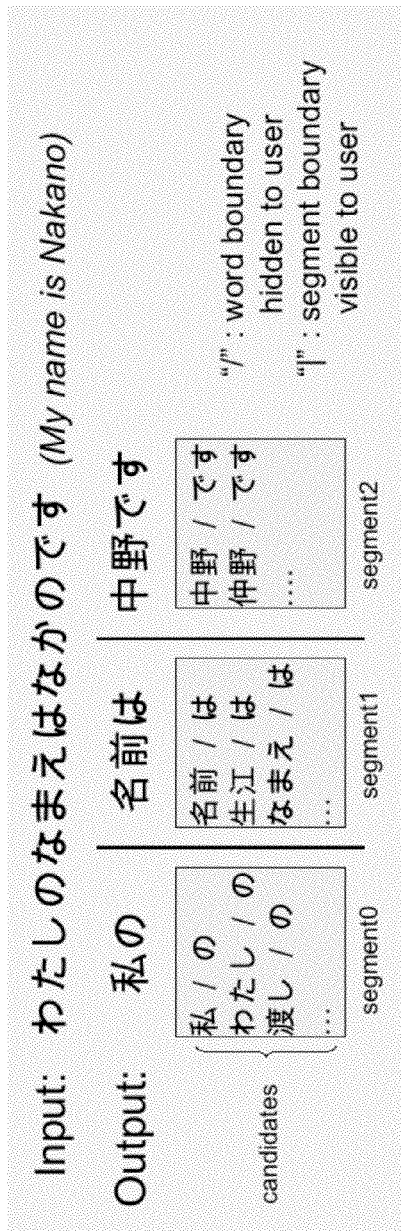
FIG. 6A illustrates an exemplar text string conversion.
Figure 6B:
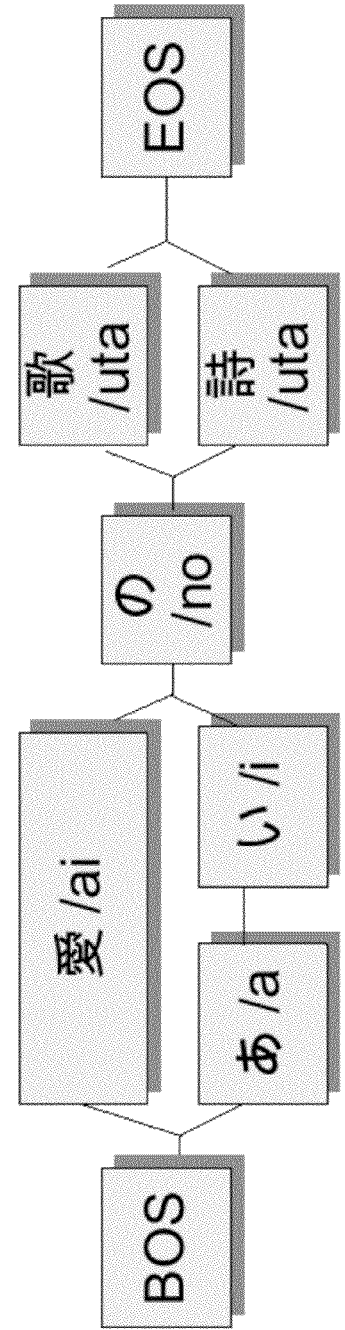
FIG. 6B illustrates an exemplar word lattice.

Referring now to FIGS. 6A and 6B, the converter layer 52 provides the core functionality of the client-server IME of the present disclosure. If the interpreter module 56 interprets a subsequent key event as a conversion (Convert) command to convert a preedit (e.g., [あい]) to one or more corresponding Japanese Kanji characters (e.g., [愛]), the preedit is generated at the session layer 50 and is provided as a query to the converter layer 52. The converter layer 50 processes the preedit and generates one of more results that include word segments. Each word segment is provided as a set of candidates, each of which includes a sequence of words. Each candidate includes an associated score, and the candidates are listed in a candidate list based on the order of the scores.

FIG. 6A illustrates an exemplar text string conversion (i.e., "My name is Nakano" provided as a Hiragana text string), a corresponding conversion output including a plurality of word segments (e.g., segment0, segment1, segment2), and candidate lists corresponding to each word segment. Each candidate list includes one or more conversion candidates that can be selected by the user. The word segments are generated from an internally generated word lattice, an example of which is discussed in detail with reference to FIG. 6B. The converter layer 52 generates this lattice from the string query based on a language model.

FIG. 6B illustrates an exemplar word lattice corresponding to [あいのうた], which is a Hiragana text string corresponding to the Romaji text string [ainouta], or love song in English. The converter layer 52 generates the exemplar word lattice of FIG. 6B, which includes beginning of sentence (BOS) and end of sentence (EOS) indicators and candidate conversions for the Hiragana characters. As noted above, the lattice is generated based on a language model. An exemplar language model can be constructed from aggregated web data, which can be provided as text data.

As noted above, the converter layer 52 includes one or more rewriter modules 70. The rewriter module 70 performs supplemental processing that can include, re-ranking candidates based on a user's history (e.g., determined from the user history record 72). The rewriter is called after the main conversion process and after the user has submitted the result. The rewriter module 70 can adjust the main converter's result and can record the candidate selected by the user. Exemplar rewriter routines can include, but are not limited to, user history learning (e.g., adjusting segment boundary and re-ranking candidates), single Kanji dictionary (e.g., adding single Kanji characters to candidates), symbol dictionary (e.g., adding symbol characters to candidates), date (e.g., adding a date string to a candidate), collocation dictionary (e.g., re-rank candidates based on word collocation), and number (e.g., extend number candidates).

User history learning is a particularly useful rewriter routine, because it adjusts the converter results based on the user's input history, as determined from the user history record 72. When the user submits a result with either or both of segment boundary modification and candidates of segments, the user history learning rewriter records a pair that includes the query and the user's modification. The next time the user inputs the recorded query, the rewriter modifies the default boundary and the order of candidates based on the recorded pair. The user history learning rewriter uses a caching algorithm to record the user's history. The caching algorithm can include, but is not limited to, least recently used (LRU).

The storage layer 54 is the bottom layer and manages various kind of immutable dictionary data. The storage layer 54 provides a plurality of dictionary look ups including: common prefix match (e.g., key:abc=>result:{a, ab, abc}), exact match (e.g., key:abc=>result:{abc}), and predictive match (e.g., key:abc=>result:{abc, abcd, abcef, ... }). The common prefix match is used for normal conversion. The predictive match is namely used for prediction and suggestion, and the exact match is used for debugging.

The storage layer 54 supports a plurality of dictionary types that can include, but is not limited to, TX, Darts, and User. The TX dictionary is provided as the main dictionary and can be structured by TX using a level-order unary degree sequence (LOUDS) library. The user dictionary 76 is provided as a user registered plain text dictionary.

Embodiments of the present disclosure can employ LOUDS for the data structure of the main dictionary. LOUDS is a data structure algorithm taking advantage of TRIE, which is an ordered tree data structure for storing an associative array having keys provided as strings. Using the LOUDS data structure, the data is stored as a bit sequence making the data size very compact. The main dictionary includes a key index in LOUDS, word attributes in array, and word values in LOUDS. The key index points to word attributes, and each word attribute either points to the corresponding leaf of the word value, or the word attribute has a special bit of transliteration.

3.0 Example Processes

Figure 7:
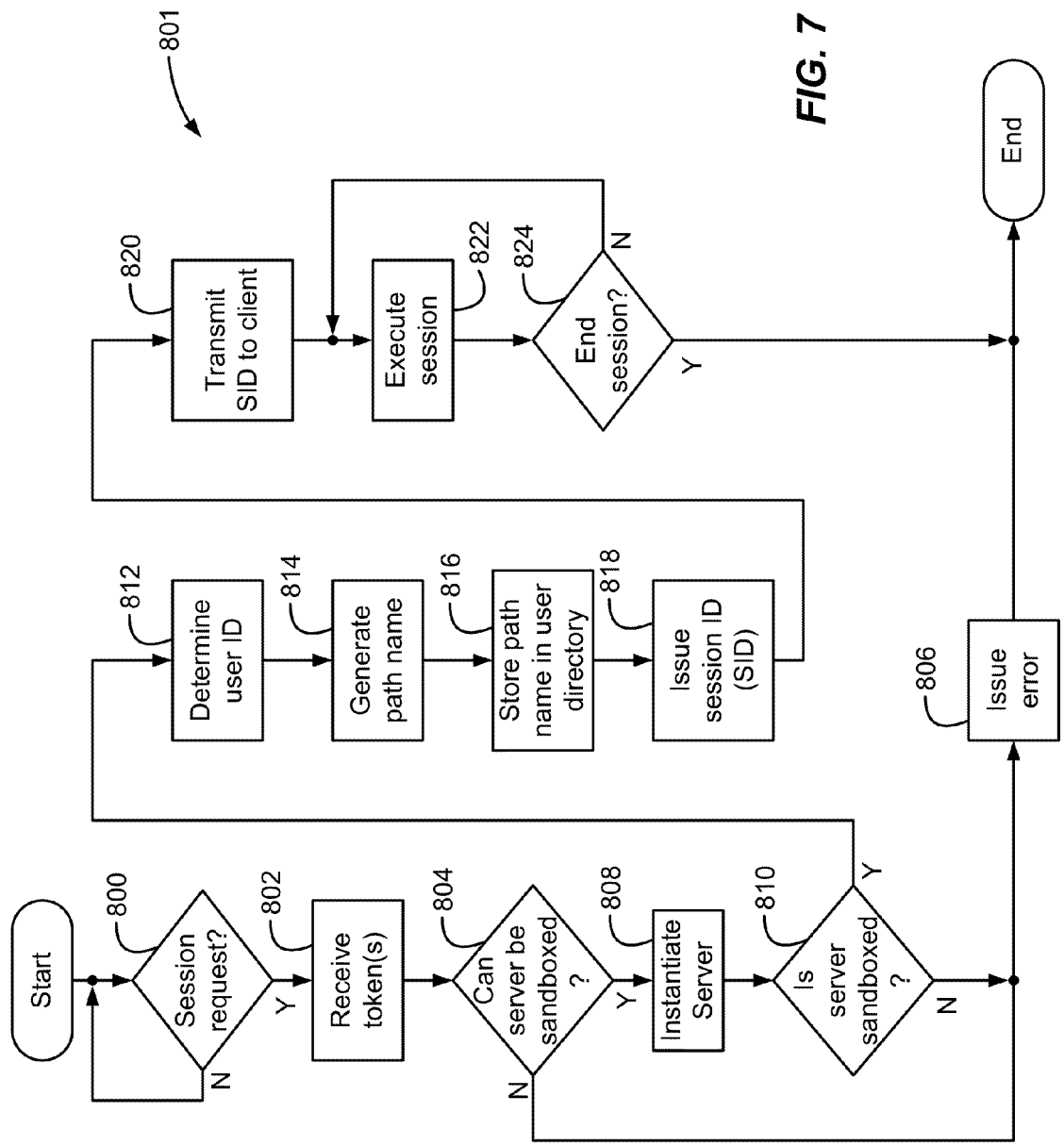
FIG. 7 is a flowchart illustrating an exemplar process for establishing a client-server IME session.

Referring now to FIG. 7, an exemplar process 801 for establishing a client-server IME session is illustrated. The process 801 can be implemented, for example, in a single computer device using the client-server architecture 10 above, in which steps can be performed by the operating system, steps can be performed on the client-side and steps can be performed on the server-side.

The process 801 determines whether a client-server session is requested (800). For example, the operating system can receive a session request from a client and determine that a client-server session has been requested. As discussed above, the request can be automatically generated and issued upon instantiation of an IME within a client application (e.g., instantiating the IME within a web browser application). If a session has not been requested, the process 801 loops back.

If the session has been requested, a server executable program (e.g., IMEserver.exe) can be initiated, and one or more tokens is referenced (802) by the server executable program. For example, the request can include one or more tokens and the server executable program can reference the tokens. The process 801 determines whether a server can be instantiated within a sandbox based on the referenced tokens (804). For example, the server executable program can process the tokens and, if the tokens expected authorization values, the can be instantiated within the sandbox. If the server cannot be instantiated within a sandbox, the process issues an error (806) and ends. Conversely, if the server can be instantiated within a sandbox, the process instantiates the server (808). For example, the operating systems continues execution of the server executable program to fully instantiate the server.

The process 801 determines whether the instantiated server is actually sandboxed (810). By way of non-limiting example, the server can perform the one or more of the following checks: checking the values of one or more tokens that are set by the client, and if the values are not equal to expected values, the server is not sandboxed, comparing an identification provided by the operating system to an expected identification, and if the provided identification is equivalent to the expected identification, the server is sandboxed. If the server is not sandboxed (i.e., the server is operating as a normal process), the process 801 issues an error (806) and ends. For example, the operating system can issue and error based on a server response to the checks. If the server is sandboxed, the process 801 determines the user ID of the user associated with the requesting application (812). By way of non-limiting example, the user ID can be provided with the session request.

The process 801 generates a path name for the communications channel between the client and server (814). For example, the server generates the path name as a randomly generated 128-bit path name. The process 801 stores the path name to a user profile that corresponds to the user ID (816). For example, the server can store the path name to a user profile in local memory. In such a case, although the server may be sandboxed, the policy allows the server to write to local memory. In this manner, the client can subsequently access the user profile to determine the path name that was generated by the server. The process 801 issues a session ID (SID) for the current session (818), and transmits the SID to the client (820). For example, the server issues a unique SID for a session with a particular server, and transmits the SID to the server using a connection that is established based on the generated path name.

The session is executed (822). An exemplar process that can be performed as part of the session execution is described in further detail below with reference to FIG. 8.

The process determines whether the session is to be ended (824). For example, an end session request can be generated on the client-side, if the user closes client application and/or the IME-UI within the application. In some implementations, the server receives an end session request, deletes all resources and/or objects allocated for the particular session, and the session ends. If the session is not to be ended, the process 801 loops back to step 822. If the session is to be ended, the session is terminated and the process 801 ends.

Figure 8:
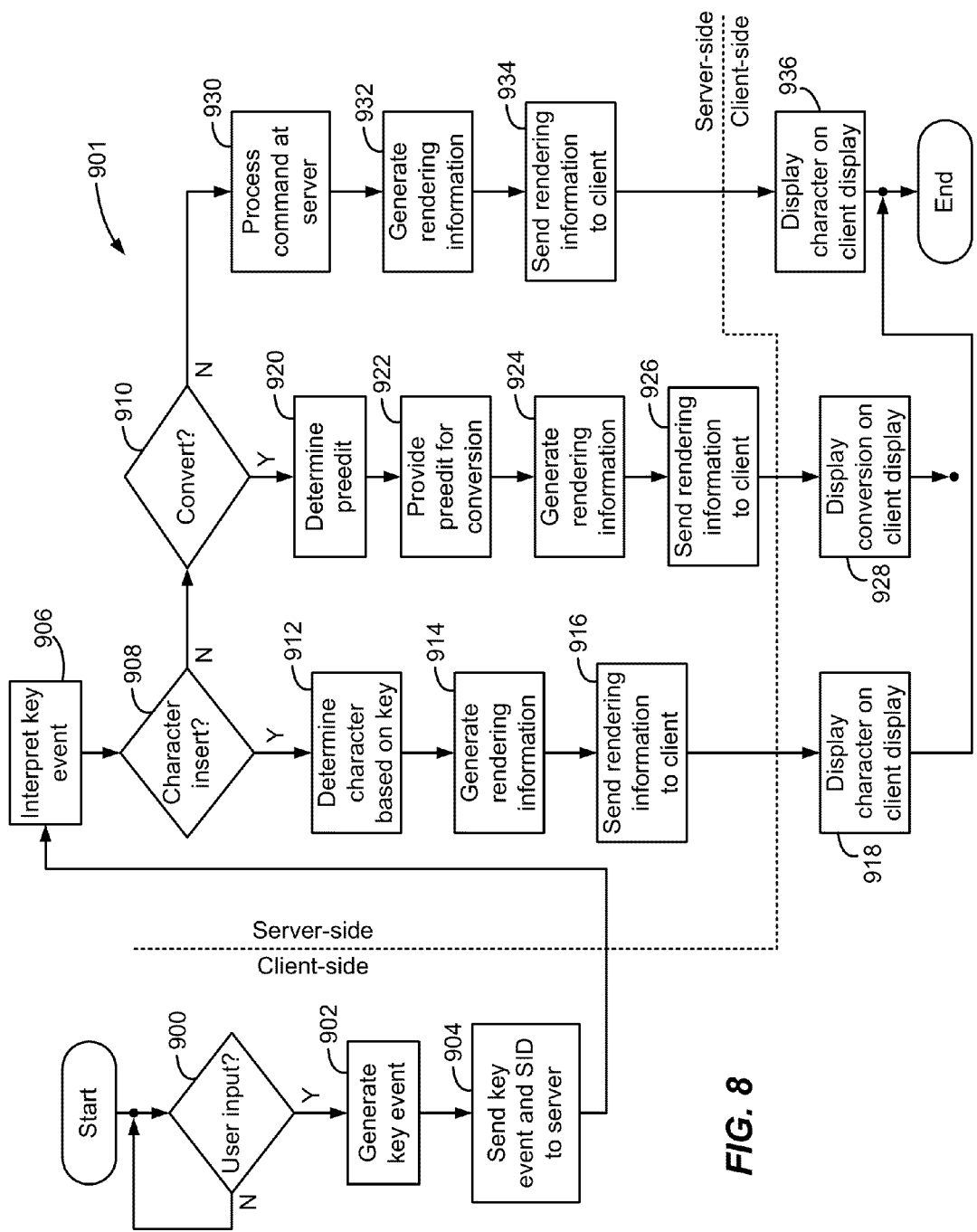
FIG. 8 is a flowchart illustrating an exemplar process for text and text string conversion using a client-server IME session.

FIG. 8 is a flowchart illustrating an exemplar process 901 for text and text string conversion using a client-server IME session. The exemplar process 901 can be performed during execution of a session (e.g., 822 of FIG. 7). As described below, portions of the process 910 are performed in the client, and other portions of the process are performed in the server.

The process 901 determines whether a user input has been detected (900). For example, the client monitors for user inputs (e.g., key presses, mouse clicks, screen touches). If a user input has not been detected, the process 901 loops back. If a user input has been detected, the process 901 generates a corresponding key event (902), and sends the key event and SID to the server (904). For example, the client generates a key event based on the user input and sends the key event and SID to the server.

At the server, the process 901 interprets the key event (906) and determines whether the key event corresponds to a character insert command (908). If the key event does not correspond to a character insert command, the process 901 continues at 910. If the key event corresponds to a character insert command, the process 901 continues at 912.

If the key event corresponds to a character insert command, the process 901 determines a corresponding character based on the key event (912) and generates rendering information (914). For example, the server determines the corresponding character based on the key event and generates the rendering information. The process 901 sends the rendering information to the client (916). For example, the server sends the rendering information to the client over a connection.

The client 12, in response to receiving the rendering information, displays the corresponding character on the client display (918), or in an environment associated with the client 12, such as a word processing program, and ends.

At the server 14, if the key event does not correspond to a character insert command, the process 901 determines whether the key event corresponds to a convert command (910). If the key event corresponds to a convert command, the process 901 continues at 920. If the key event does not correspond to a convert command, the process 901 continues at 930. At 920, the process 901 determines a preedit (920) based on the key events received from the client device since the last conversion execution. Because the server is stateful, the server is aware of the key events and commands for the particular session. The process 901 provides the preedit as a query for conversion (922), generates corresponding rendering information (924), sends the rendering information to the client (926). The client 12, in response to receiving the rendering information, displays the corresponding character on the client display (928), or in an environment associated with the client 12, such as a word processing program, and ends.

At 930, if the key event does not correspond to a character insert command, another command is indicated. Other commands can include a move cursor command and a text select command. The process 901 processes the indicated command at the server (930). The processor 901 generates rendering information (932), sends the rendering information to the client (934). The client 12, in response to receiving the rendering information, displays the corresponding character on the client display (936), or in an environment associated with the client 12, such as a word processing program, and ends.

An exemplar client-server session will now be described. The exemplar client-server session is provided as a non-limiting illustration of embodiments of the present disclosure. The exemplar client-server session includes the following key sequence: [a], [i], [space], [space] and [enter]. More specifically, the client receives an input indicating that [a] has been input (e.g., the [a] key has been pressed on the keyboard) (see 900 of FIG. 8). The client generates a key event and transmits the key event and the SID to the server (see 902 and 904 of FIG. 8). Upon receiving the key event, the session layer interprets the key event to an InsertCharacter command (see 906 and 908 of FIG. 8) and sends the command with [a] to the preedit. The preedit converts [a] (Japanese Romaji) to [あ] (Japanese Hiragana). The preedit returns the result "あ (a)" to the session layer. Corresponding rendering information is generated and is transmitted to the client (see 912, 914 and 916 of FIG. 8), and the client displays [あ] to the user (see 918 of FIG. 8).

The client receives an input from the user indicating that [i] has been input (e.g., the [i] key has been pressed on the keyboard), and determines a key input is detected (see 900 of FIG. 8). The client generates a key event and transmits the key event and the SID to the server (see 902 and 904 of FIG. 8). Upon receiving the key event, the session layer interprets the key event to an InsertCharacter command (see 906 and 908 of FIG. 8) and sends the command with [i] to the preedit. The preedit converts [i] (Japanese Romaji) to [い] (Japanese Hiragana). Because the server is stateful, it is aware that the previous conversion included [a] to [あ]. Consequently, the preedit now returns the result "あい (ai)" to the session layer. Corresponding rendering information is generated and is transmitted to the client (see 912, 914 and 916 of FIG. 8), and the client displays [あい] to the user (see 918 of FIG. 8).

The client then receives an input from the user indicating that [space] has been input (e.g., the spacebar has been pressed on the keyboard) (see 900 of FIG. 8). The client generates a key event and transmits the key event and the SID to the server (see 902 and 904 of FIG. 8). Upon receiving the key event, the session layer interprets the key event to a Convert command (see 906 and 910 of FIG. 8). Because the server is stateful, the server is aware that the previous character sequence was "あい (ai)" and sends the comment with "あい (ai)" to the converter. The converter converts [あい] (Japanese Hirigana) to [愛] (Japanese Kanji). The converter returns the result "愛" to the session layer (see 920 and 922 of FIG. 8). Corresponding rendering information is generated and is transmitted to the client (see 924 and 926 of FIG. 8), and the client displays [愛] to the user (see 928 of FIG. 8).

The client then receives an input from the user indicating that [space] has again been input (e.g., the spacebar has been pressed on the keyboard) (see 900 of FIG. 8). The client generates a key event and transmits the key event and the SID to the server (see 902 and 904 of FIG. 8). Upon receiving the key event, the session layer interprets the key event to a Convert command (see 906 and 910 of FIG. 8). Because the server is stateful, the server is aware of the previous conversion from [あい] (Japanese Hirigana) to [愛] (Japanese Kanji). This information is provided to the converter, which determines one or more candidate conversions to Japanese Katakana from "あい" (Japanese Hirigana). More specifically, a candidate list is generated and includes one or more Japanese Katakana candidates that correspond to "あい". In this example, the candidate list can include [愛, 合,あい,相, ...] (Japanese Kanji, Katakana or Hiragana). The candidate list is returned to the session layer, and rendering information is generated based thereon (see 920, 922 and 924 of FIG. 8). The rendering information is transmitted to the client (see 926 of FIG. 8), and the client displays the candidate list [愛, 合,あい,相, ...] to the user with the first candidate [愛] highlighted or otherwise indicated as the currently selected candidate (see 928 of FIG. 8).

To select a different candidate from the candidate list, the user can input a key event (e.g., depress the "↓" down key). In response to the user input, the client generates a key event and transmits the key event and the SID to the server (see 902 and 904 of FIG. 8). Upon receiving the key event, the session layer interprets the key event as a SelectNextCandidate command and processes the command (see 906 and 930 of FIG. 8). Corresponding rendering information is generated and is transmitted to the client (see 932 and 934 of FIG. 8). The client displays the candidate list [愛, 合,あい,相, ...] to the user with the second candidate [合] highlighted or otherwise indicated as the currently selected candidate (see 936 of FIG. 8).

To choose the currently selected candidate from the candidate list, the user provides a corresponding input (e.g., pressing [enter]). In response to the user input, the client generates a key event and transmits the key event and the SID to the server (see 902 and 904 of FIG. 8). Upon receiving the key event, the session layer generates a corresponding response for submitting the selected candidate (e.g., [合]) to the client. The response is received by the client, which presents the selected candidate (e.g., [合]) in the application. If no further text is to be entered or converted, the client can send a cancel session message to the server with the SID. In response, the server ends the client's session.

Figure 9:
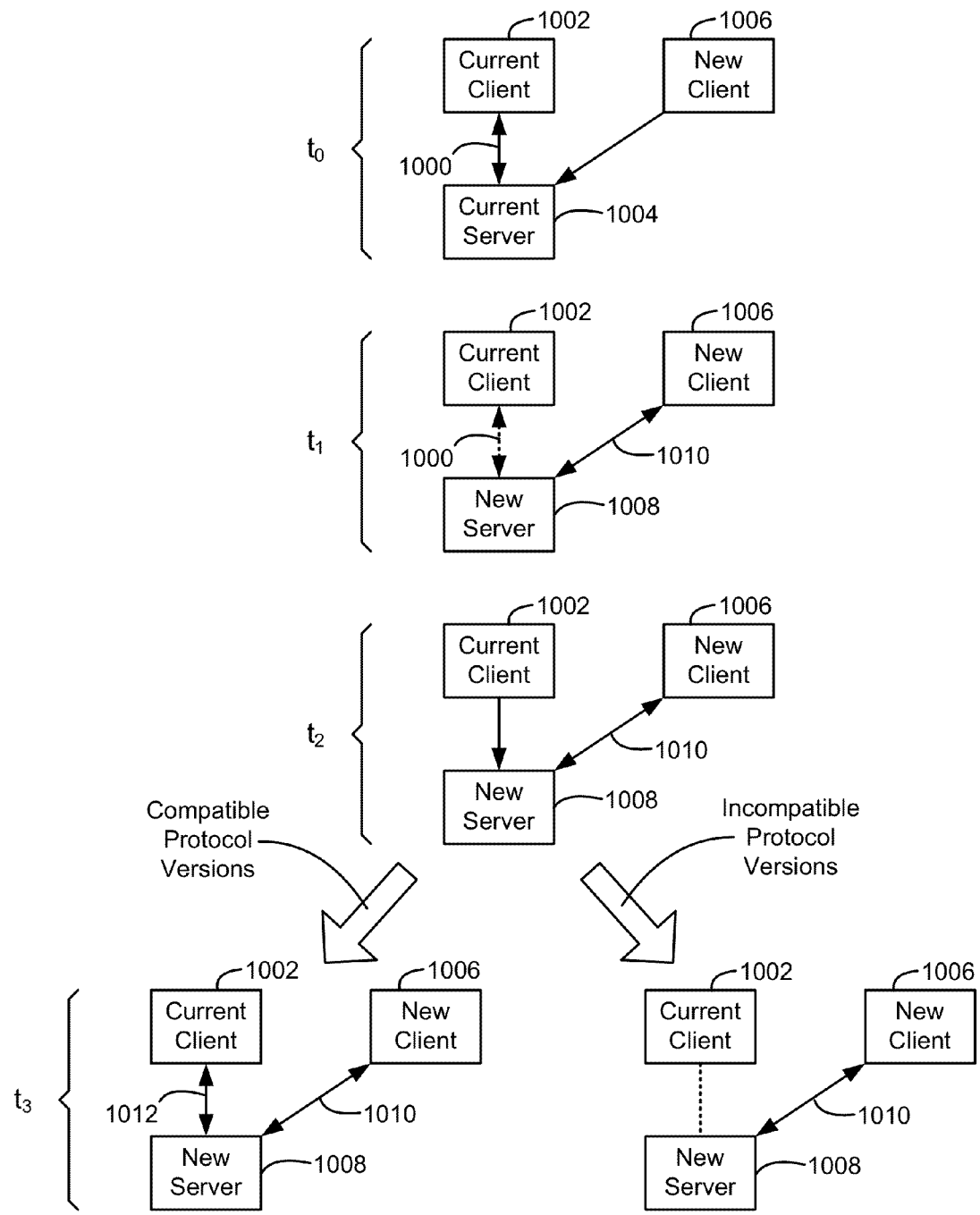
FIG. 9 is a block diagram illustrating a version and protocol check
Figure 10:
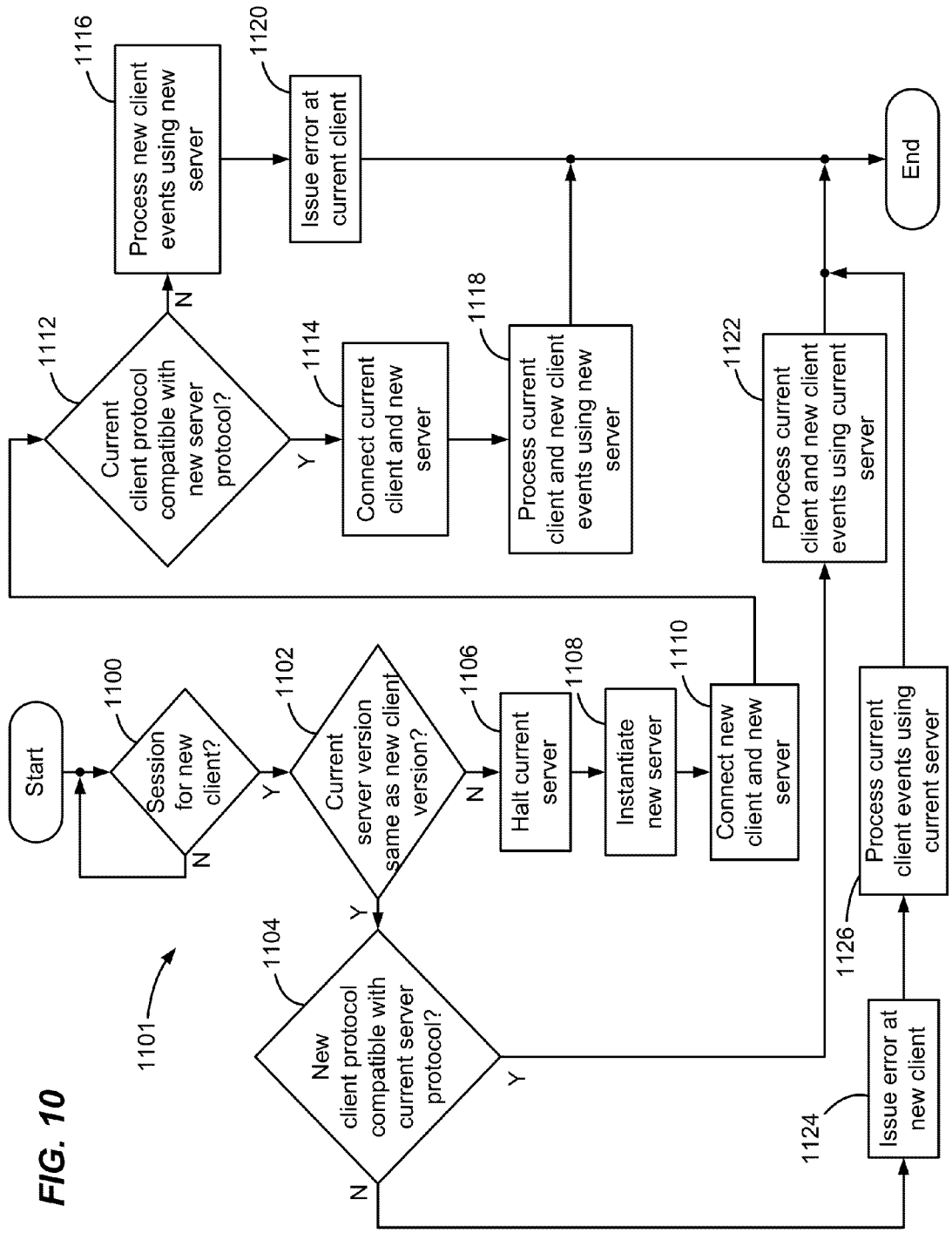
FIG. 10 is a flowchart illustrating an exemplar process for providing a version and protocol check.

Referring now to FIGS. 9 and 10, embodiments of the client-server architecture enable the server to be updated without a restarting the client. For example, the server can be updated without having to shutdown and restart the client application program that may be communicating with the server. More specifically, an update can be executed silently (i.e., without alerting the user) when a newly connected client has a communication protocol that is compatible with the current server. As a result of the update, the current server is halted and a new server is instantiated. In the event that the version of the communication protocol of the client is not compatible with the version of the communication protocol of the new server, this condition is detected and the user is prompted.

FIG. 9 is a block diagram illustrating a version and protocol check. A session is in progress between a current client 1002 and a current server 1004 at time period $t_0$. At time period $t_0$, a new client 1006 seeks to establish a session with the current server 1004. Although not illustrated in FIG. 9, if the new client 1006 and the current server 1004 are of the same version, the session is established and both the current client 1002 and the new client 1006 interact with the current server 1004. In the block diagram of FIG. 9, it is determined that the version of the new client is newer than the version of the current server 1004 at time period $t_1$. Because the version of the new client is newer than the version of the current server, the current server 1004 is aborted and a new server 1008 is instantiated. A session 1010 is established between the new client 1006 and the new server 1008. Consequently, the current session 1000 is temporarily suspended. The user interfacing with the current client 1002 is not alerted to this temporary suspension.

The new server 1008 is installed by an auto update process, which is a process that checks for the latest server version and automatically installs it. An infrastructure can be provided to perform this function, which infrastructure includes a program to install requested software and keep it up to date. For example, an update service can be implemented on a computer device and can request necessary updates from a remote IME support server over an Internet connection. The program can overwrite the current server executable file. In some embodiments, the program can rename the current server executable file to a temporary file and install a new server binary to the default server path. In this scenario, the current server is running while the executable file is already replaced with a new one.

At time period $t_2$, it is determined whether the communication protocol of the current client 1002 and of the new server 1008 are compatible More specifically, the protocol includes a special field for storing a protocol version value. When the new server 1008 is initialized, the server's protocol version value is stored to a local file. The current client 1002 loads the file and checks whether the server's protocol version is the same as the client's protocol version. In some embodiments, a table of compatible protocols can be provided and can be implemented to whether the server's protocol version is the same as the client's protocol version.

If the communication protocols are compatible, a session 1012 is established between the current client 1002 and the new server 1008. In this case, the server version of the current client 1002 is older than the server version of the new server 1008. Accordingly, a new server version can be backwards compatible to older server versions. If the communication protocols are not compatible, the session between the current client 1002 and the new server 1008 remains closed, and the user is alerted to the error on the client-side. For example, an alert can be generated instructing the user to restart the particular client application.

With particular reference to FIG. 10, an exemplar process 1101 for providing a version and protocol check is illustrated. The process 1101 of FIG. 10 presumes that a current client and a current server are communicating through a current session.

The process 1101 determines whether a session has been requested from a new client (1100). For example, the operating system can determine whether a client has generated a session request. If a session has not been requested from a new client, the process 1101 loops back. If a session has been requested for a new client, the process determines whether a current server version is older than the new client version (1102). More specifically, a special field is provided for storing a server version value. When the current server is initialized, the server's version value is also stored to a local file. If the current server version is not older than the new client version, the process 1101 continues at 1104. For example, the operating system can compare the server version values.

If the current server version is older than the new client version, the process 1101 halts the current server (1106) and the current session with the current client ends. For example, the operating system can halt the current server. The process 1101 instantiates a new server (1108). The process 1101 connects the new server and the new client (1110). The process 1101 determines whether the current client protocol is compatible with the new server protocol (1112). For example, the operating system can determine whether the protocol's are compatible.

If the current client protocol is compatible with the new server protocol, the process 1101 continues at 1114. The process 1101 connects the current client to the new server and a session is established therebetween (1114). For example, the server generates the path name and issues the SID to the current client. The process 1101 processes the current client and new client events using the new server (1118) and the ends.

Returning to 1112, if the current client protocol is not compatible with the new server protocol, the process 1101 only processes the new client events using the new server (1116). The process 1101 generates an error at the current client (1120) and ends. For example, the operating system can generate an error at the current client instructing the user to restart the client.

Returning to 1104, the process 1101 determines whether the new client protocol is compatible with the current server protocol (1104). For example, the operating system can compare the protocols. If the new client protocol is compatible with the current server protocol, the current client events and the new client events are processed using the current server (1122) and the process ends. If the new client protocol is not compatible with the current server protocol, an error is issued at the new client (1124). The current client events are processed using the current server (1126) and the process ends.

As discussed in detail above, the client-server IME architecture 10 includes a stateless client that sends each key event to the server and that receives rendering information from the server. If, during an input session, the server is aborted and rebooted, unintended rendering information can be provided to the client. To deal with such scenarios, the client-server IME of the present disclosure provides for rebooting of an aborted server, detecting the reboot of the server, and sending a recorded key event sequence to the server to bring the new session current. The key event sequence can be stored for a short period of time. For example, the key event sequence can be stored for the lifespan of the current session and then cleared upon ending of the session. As another example, the key event sequence can be stored for the lifespan of a connection within the current session. As discussed above, the connection can be terminated after the server has transmitted the rendering information corresponding to the last key event sequence to the client.

The client-server IME architecture 10 infinite loops caused by sending key event sequence, which may repeatedly crash the server, and enables such crashing key event sequences to be identified and recorded. For example, the server may be caused to crash as a consequence of a particular key event sequence. Upon reboot of the server, that same key event sequence could be transmitted back to the newly instantiated server in an effort to bring the state of the new server current to the previous session. However, and because the particular key event sequence may be an erroneous key event sequence, the new server may also be caused to crash.

Figure 11:
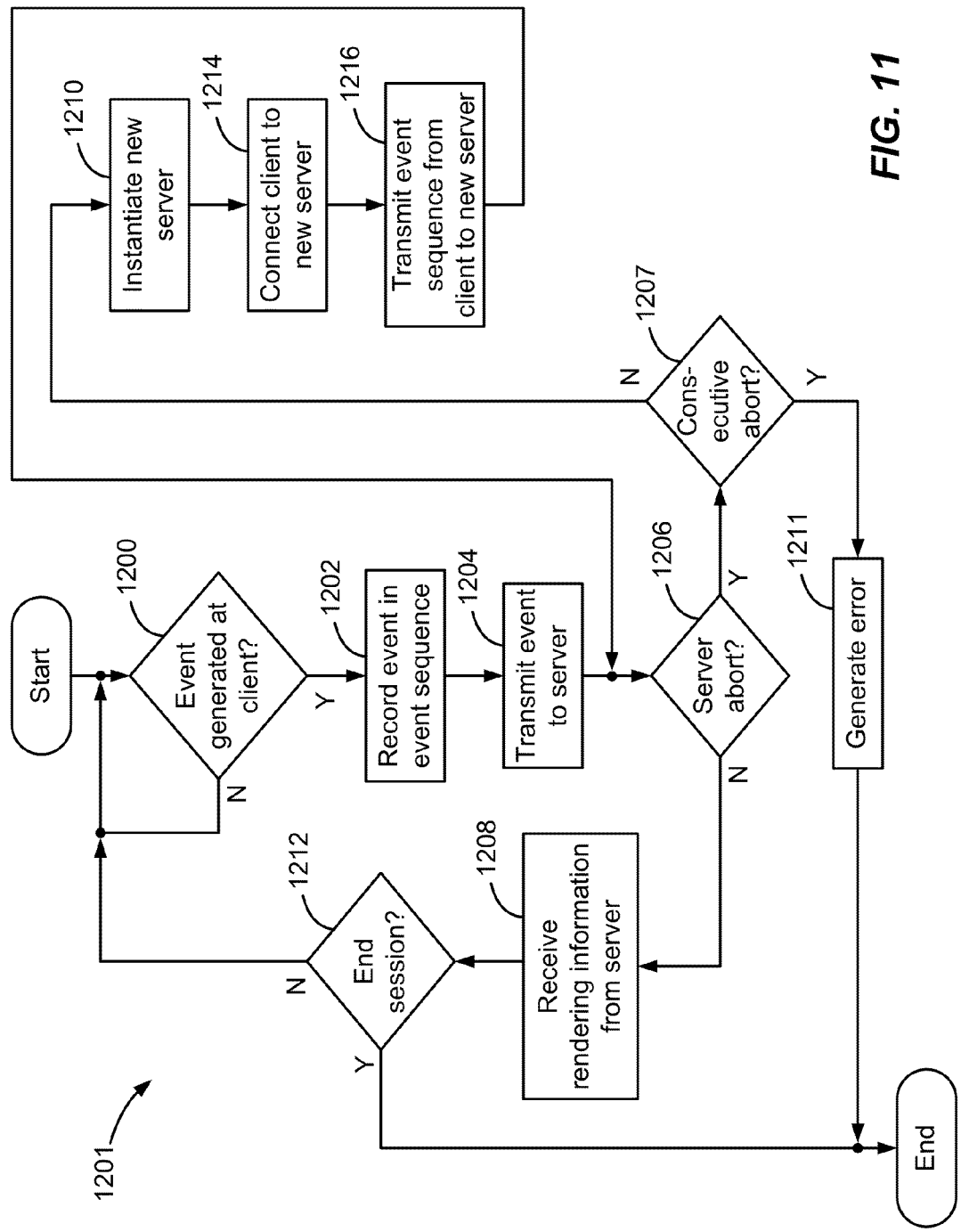
FIG. 11 is a flowchart illustrating an exemplar process for reestablishing a client-server IME session.

Referring now to FIG. 11, an exemplar process 1201 for reestablishing a client-server IME session is illustrated. The process 1201 determines whether an event is generated at the client (1200). For example, the client 12 can monitor for a key event based on a user input.

If an event is not generated at the client, the process 1201 loops back. If an event is generated at the client, the process 1201 records the event in an event sequence (1202). More specifically, the client can store the event in an event sequence in a local memory of the device, on which the client process executes. The event is transmitted to the server (1204), and the process 1201 determines whether the server aborted (1206). For example, an client 12, an IME support framework, or a computer operating system can determine whether the server 14 has stopped functioning.

If the server did not abort, the process continues at 1208, where rendering information corresponding to the event is received at the client from the server (1208). The process 1201 determines whether the session is to be ended (1212). If the session is not to be ended, the process 1201 loops back to 1200. If the session is to be ended, the process 1201 ends.

Returning to 1206, if the server aborted (1206), the process 1201 determines whether the abort was a consecutive abort (e.g., second, third, or fourth consecutive abort) (1207). For example, after each server abort, a counter can be incremented by the IME client 12, the IME support framework, or the operating system. If the abort was a consecutive abort, an error is generated (1211) and the process 1201 ends. The error can be generated at the client and can be displayed to the user. The error prohibits in infinite loop of servers instantiations and aborts.

If the abort was not a consecutive abort, the process 1201 instantiates a new server (1210). More specifically, the operating system can instantiate a new server, as discussed in detail above. The client connects to the new server and the process 1201 establishes a new session (1214). The recorded event sequence is transmitted from the client to the new server (1216). Using the event sequence, the server 14 can instantiate a session for the client 12 that is at the same state as the previous session for the client 12 when the server 14 aborted. The process 1201 then loops back to 1206.

Embodiments of the disclosure and all of the functional operations described in this specification can be implemented in digital electronic circuitry, or in computer software, firmware, or hardware, including the structures disclosed in this specification and their structural equivalents, or in combinations of one or more of them. Embodiments of the disclosure can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the disclosure can be implemented in a computing system that includes a back end component, e.g., as a data server, or that includes a middleware component, e.g., an application server, or that includes a front end component, e.g., a client computer having a graphical user interface or a Web browser through which a user can interact with an embodiment of the disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments of the disclosure. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of embodiments of the present disclosure have been described. Nevertheless, it will be understood that various modifications may be made without departing from the spirit and scope of the present disclosure. Accordingly, other embodiments are within the scope of the following claims.

What is claimed is:

1. A computer-implemented method, comprising:
receiving an input method editor (IME) server request, the IME server request including one or more tokens and requesting that an IME server be instantiated, the IME server executing one or more IME functions based on a key event sent from an IME client, wherein the IME server is a stateful server that stores both requests and responses of a communication session between the IME server and the IME client;
determining that the IME server is authorized to be instantiated in a restrictive environment based on the one or more tokens, wherein each of the one or more tokens corresponds to a respective restriction level of functionality provided by the restrictive environment;
instantiating the IME server in the restrictive environment in response to determining that the IME server is authorized to be instantiated in the restrictive environment based on the one or more tokens;
responsive to instantiating the IME server, generating a randomly generated path name for communication between the IME client and the IME server, wherein the path name comprises a named pipe;
storing the path name in a user profile directory, wherein access to the user profile directory is enabled by verification of a security token provided by the IME client;
generating a unique session identifier (SID) for a session associated with a user at the IME client; and
transmitting the unique SID to the IME client using a connection that is established based on the path name.

2. The computer-implemented method of claim 1, further comprising:
executing one or more checks that verify that the IME server is instantiated in the restrictive environment;
determining that the IME server is not executing in the restrictive environment based on the one or more checks; and
halting the IME server in response to determining that the IME server is not executing in the restrictive environment.

3. The computer-implemented method of claim 2, wherein the one or more checks include at least one of comparing a token value to an expected value, comparing a session identification of the IME server to an expected identification, and determining that the IME server has system privileges.

4. The computer-implemented method of claim 1, further comprising:
executing one or more checks that verify that the IME server is instantiated in the restrictive environment; and
determining that the IME server is executing in the restrictive environment based on the one or more checks.

5. The computer-implemented method of claim 1, wherein the restrictive environment limits types of data that the IME server is authorized to write to memory.

6. The computer-implemented method of claim 1, wherein the IME server request is generated by the IME client, and the IME client is a stateless IME client that stores only requests that the IME client issues to the IME server.

7. The computer-implemented method of claim 1, further comprising:
instantiating the restrictive environment based on a first token to provide a first restriction level of the restrictive environment;
executing the IME server within the restrictive environment at the first restriction level;
calling a function;
re-instantiating the restrictive environment based on a second token to provide a second restriction level in response to the function.

8. The computer-implemented method of claim 7, wherein the first restriction level is different from the second restriction level.

9. The computer-implemented method of claim 1, wherein the IME client and the IME server are executed on a common device.

10. The computer-implemented method of claim 1, wherein the one or more tokens comprises a security token that corresponds to the path name for communication between the IME server and the IME client.

11. The computer-implemented method of claim 10, wherein the security token further corresponds to a process identifier (PID) of the path name.

12. The computer-implemented method of claim 1, wherein the path name comprises a randomized multi-bit path name.

13. A system, comprising:
a computer-readable storage medium having instructions stored thereon; and
a device including one or more data processing apparatus that execute the instructions to cause the one or more data processing apparatus to perform operations comprising:
receiving an input method editor (IME) server request, the IME server request including one or more tokens and requesting that an IME server be instantiated, the IME server executing one or more IME functions based on a key event sent from an IME client, wherein the IME server is a stateful server that stores both requests and responses of a communication session between the IME server and the IME client;
determining that the IME server is authorized to be instantiated in a restrictive environment based on the one or more tokens, wherein each of the one or more tokens corresponds to a respective restriction level of functionality provided by the restrictive environment;
instantiating the IME server in the restrictive environment in response to determining that the IME server is authorized to be instantiated in the restrictive environment based on the one or more tokens;
responsive to instantiating the IME server, generating a randomly generated path name for communication between the IME client and the IME server, wherein the path name comprises a named pipe;
storing the path name in a user profile directory, wherein access to the user profile directory is enabled by verification of a security token provided by the IME client;
generating a unique session identifier (SID) for a session associated with a user at the IME client; and
transmitting the unique SID to the IME client using a connection that is established based on the path name.

14. The system of claim 13, wherein the operations further comprise:
executing one or more checks;
determining that the IME server is not executing in the restrictive environment based on the one or more checks; and
halting the IME server in response to determining that the IME server is not executing in the restrictive environment.

15. The system of claim 14, wherein the one or more checks include at least one of comparing a token value to an expected value, comparing a session identification of the IME server to an expected identification, and determining that the IME server has system privileges.

16. The system of claim 13, wherein the operations further comprise:
executing one or more checks that verify that the IME server is instantiated in the restrictive environment; and
determining that the IME server is executing in the restrictive environment based on the one or more checks.

17. The system of claim 13, wherein the restrictive environment limits types of data that the IME server is authorized to write to memory.

18. The system of claim 13, wherein the IME server request is generated by the IME client, and the IME client is a stateless IME client that stores only requests that the IME client issues to the IME server.

19. The system of claim 13, wherein the operations further comprise:
instantiating the restrictive environment based on a first token to provide a first restriction level of the restrictive environment;
executing the IME server within the restrictive environment at the first restriction level;
calling a function;
re-instantiating the restrictive environment based on a second token to provide a second restriction level in response to the function.

20. The system of claim 19, wherein the first restriction level is different than the second restriction level.

21. A computer-implemented method, comprising:
receiving an input method editor (IME) server request, the IME server request including one or more tokens and requesting that an IME server be instantiated, the IME server executing one or more IME functions based on a key event sent from an IME client, wherein the IME server is a stateful server that stores both requests and responses of a communication session between the IME server and the IME client;
determining that the IME server is authorized to be instantiated based on the one or more tokens, wherein each of the one or more tokens corresponds to a respective restriction level of functionality provided by a restrictive environment;
instantiating the IME server in the restrictive environment in response to determining that the IME server is authorized to be instantiated based on the one or more tokens, the restrictive environment limiting the functionality of the IME server;
responsive to instantiating the IME server, generating a randomly generated path name for communication between the IME client and the IME server, wherein the path name comprises a named pipe;
storing the path name in a user profile directory, wherein access to the user profile directory is enabled by verification of a security token provided by the IME client;
generating a unique session identifier (SID) for a session associated with a user at the IME client; and
transmitting the unique SID to the IME client using a connection that is established based on the path name.

22. A system, comprising:
a computer-readable storage medium having instructions stored thereon; and
a device including one or more data processing apparatus that execute the instructions to cause the one or more data processing apparatus to perform operations comprising:
receiving an input method editor (IME) server request, the IME server request including one or more tokens and requesting that an IME server be instantiated, the IME server executing one or more IME functions based on a key event sent from an IME client, wherein the IME server is a stateful server that stores both requests and responses of a communication session between the IME server and the IME client;
determining that the IME server is authorized to be instantiated based on the one or more tokens, wherein each of the one or more tokens corresponds to a respective restriction level of functionality provided by a restrictive environment;
instantiating the IME server in the restrictive environment in response to determining that the IME server is authorized to be instantiated based on the one or more tokens, the restrictive environment limiting the functionality of the IME server;

responsive to instantiating the IME server, generating a randomly generated path name for communication between the IME client and the IME server, wherein the path name comprises a named pipe;

storing the path name in a user profile directory, wherein access to the user profile directory is enabled by verification of a security token provided by the IME client;

generating a unique session identifier (SID) for a session associated with a user at the IME client; and transmitting the unique SID to the IME client using a connection that is established based on the path name.

* * * * *